Figure 1:
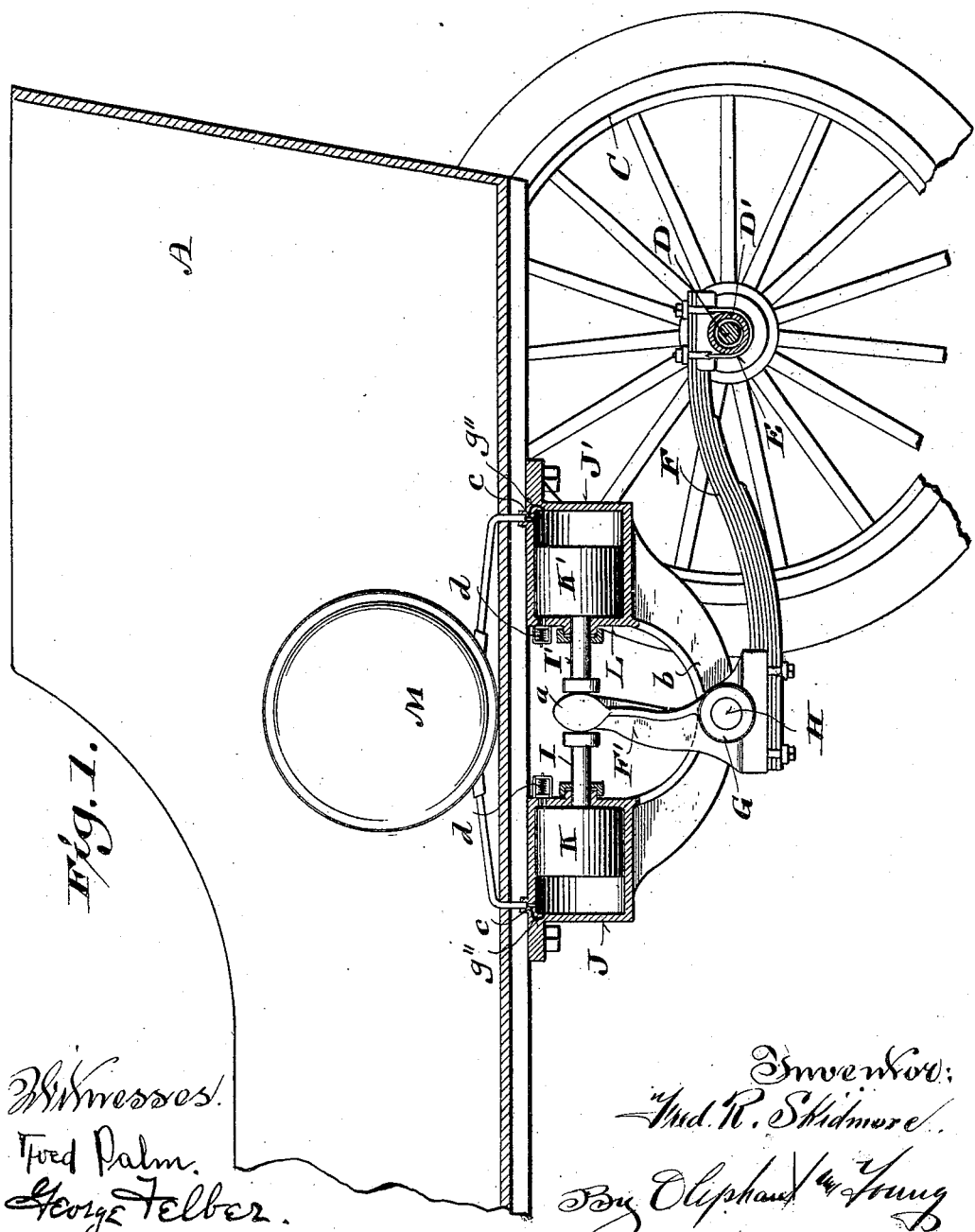

No. 886,429. PATENTED MAY 5, 1908.
F. R. SKIDMORE.
VEHICLE SPRING.
APPLICATION FILED FEB. 10, 1908.

2 SHEETS—SHEET 1.

Witnesses:
Fred Palm.
George Felber.

Inventor:
Fred R. Skidmore
By Oliphant & Young
Attorneys

No. 886,429. PATENTED MAY 5, 1908.
F. R. SKIDMORE.
VEHICLE SPRING.
APPLICATION FILED FEB. 10, 1906.
2 SHEETS—SHEET 2.
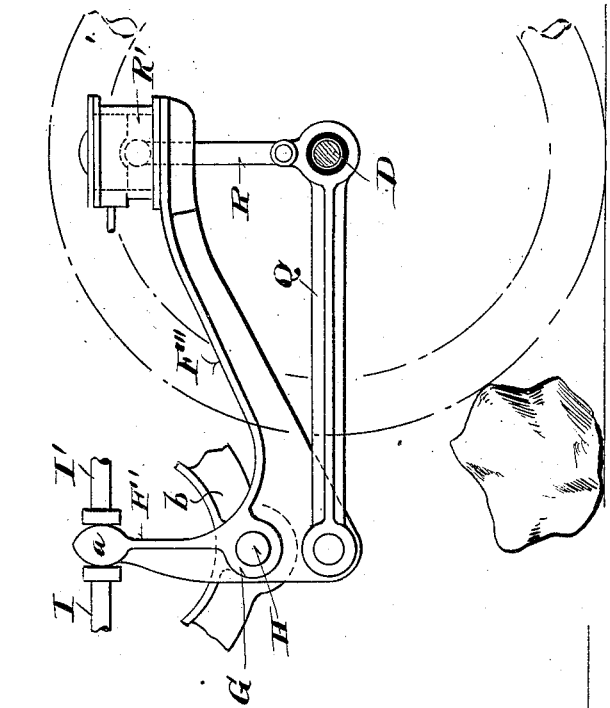
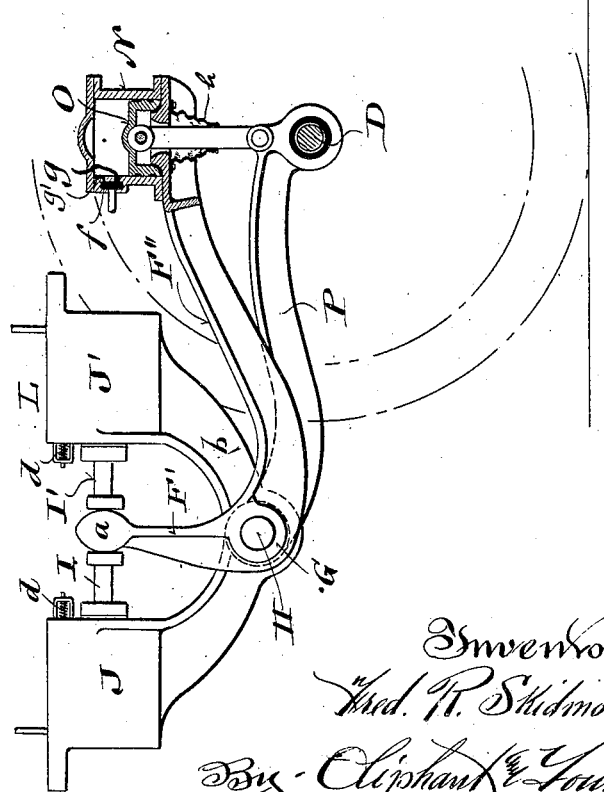

UNITED STATES PATENT OFFICE.

FREDERICK R. SKIDMORE, OF MILWAUKEE, WISCONSIN.

VEHICLE-SPRING.

No. 886,429.  Specification of Letters Patent.  Patented May 5, 1908.

Application filed February 10, 1906. Serial No. 300,415.

*To all whom it may concern:*

Be it known that I, FREDERICK R. SKIDMORE, a citizen of the United States, and resident of Milwaukee, in the county of Milwaukee and State of Wisconsin, have invented certain new and useful Improvements in Vehicle-Springs; and I do hereby declare that the following is a full, clear, and exact description thereof.

My invention consists in certain peculiarities of construction and combination of parts as fully set forth hereinafter with reference to the accompanying drawings and subsequently claimed, its object being to provide a simple and constant spring for vehicles.

In the drawings: Figure 1 represents a transverse sectional view of a portion of a vehicle with a spring attached thereto, embodying the features of my invention, and Figs. 2 and 3 detail views of modified forms of said spring.

Referring by letter to the drawings, A indicates a vehicle body, and C a wheel mounted upon the rear axle D thereof, which axle in this instance is shown incased into a sleeve D' secured by clips E to a leaf-spring F, the latter forming one arm of a bell-crank lever. The short arm F' of said lever is also fastened to the leaf-spring F, by suitable clips, and is formed with a hub G loosely mounted upon a stud H, upon which the bell-crank lever swings. The end of the short arm F' of the lever terminates with a head a interposed between opposite disposed piston rods I, I', which rods project through suitable stuffing boxes of cylinders J, J', into which are fitted pistons K, K', connected to the piston-rods. The cylinders, as shown, form part of a bracket L, which is bolted to the vehicle-body, the yoke b of which carries the fulcrum stud H of the bell-crank. Adjacent to the rear head of each cylinder are ports c in direct pipe connection with a compressed air storage tank M, the front heads of said cylinder being provided with spring-controlled check-valves d, which serve as vents for the aforesaid cylinders when the pistons therein are forced forward, there being sufficient leak around the piston-rods to prevent a vacuum upon the reverse stroke thereof.

When the several parts are in their normal positions, as shown in Fig. 1, the reservoir being filled with compressed air, it will be seen that the pistons are both forced forward in opposite directions and through their respective piston-rods, hold the bell-crank F' against motion in either direction; now should the vehicle-wheel strike an obstruction it will cause the short arm of said bell-crank lever to force the piston K forward against the wall of air, displacing the same from the cylinder and distributing it throughout the large area of the reservoir and rear end of the opposite cylinder, thus owing to the small amount of displacement in proportion to the storage area, the variation in the resiliency of the cushion would be so small that the spring action would practically remain constant throughout the stroke of the piston head and thereby avoid a shock, which would ordinarily occur. The same result would be obtained in the reverse direction were the wheel suddenly dropped into a depression, by the action of the piston in the rear cylinder J', so that by the construction and arrangement of parts, as aforesaid, the vehicle-body is suspended upon an air cushion which acts in either direction to relieve shock, the bell-crank in this instance being provided with a spring arm to take off slight variations which would not be absorbed by the compressed air that must be normally sufficient to sustain the load. The ports c of the cylinders are so located as to permit a cut-off of the reservoir by the pistons, previous to the completion of their stroke for the purpose of cushioning said pistons at this point.

Referring to Fig. 2, of the drawings, a construction is shown wherein the bell-crank lever F'' is formed in one piece and is provided with a dash-pot N at its outer end having a piston O, connected to an arm P, which arm is pivoted upon the fulcrum stud H of the bell-crank and carries the wheel-axle. The said dash-pots in this case serve as substitutes for the spring-arms of the bell-cranks to absorb minor vibrations between the wheels and said bell-cranks.

Fig. 3, of the drawings, shows still another form of my invention, wherein the axle of the vehicle-wheel is hung upon links Q, pivoted to the bell-cranks below their fulcrum stud H and also pivoted by straps R at their free ends to pistons of dash-pots R', carried by the long arms of said bell-cranks. By this arrangement should the wheel strike a large obstruction, the initial action would be to check the forward movement of said wheel, resulting in a backward pull on the link Q, which will cause the bell-crank to exert a direct pressure upon the forward piston-rod I, and the device will thereafter operate similar to the forms shown in Figs. 1 and 2, of the drawings.

The dash-pots shown in Figs. 2 and 3, are connected to the air-supply, and are similar in construction, provision being made in the air-port $f$ thereof for a cushion at the end of the piston-stroke. This is accomplished by an air-passage $g'$, which when the main passage $g$ to the port $f$ is closed by the piston, permits slow leakage of the air so as to gradually allow the said piston to complete its stroke.

While I have shown and described several variations of my invention, it is understood that any means for accomplishing the results herein described are within the scope of my invention.

Both dash-pots and cylinders are also provided with leads $g'$, $g''$, respectively, for the purpose of admitting air-pressure behind their pistons to start the same at the end of the piston strokes, and to protect the dash-pots against dust, they may be fitted with flexible dust guards $h$, as shown in Fig. 2, of the drawings.

I claim:—

1. A vehicle-spring comprising bell-cranks in pivotal connection with the vehicle, an axle carried by one pair of the bell-crank arms, and a pair of air-controlled pistons in independent opposition to each of the other pair of bell-crank arms in opposite directions.

2. A vehicle-spring comprising bell-cranks in pivotal-connection with the vehicle, an axle in yielding-connection with one pair of the bell-crank arms, and independent oppositely disposed air-controlled pistons in the path of the other arms of said bell-cranks.

3. A vehicle-spring comprising an axle, pivoted hangers for the axle, a pair of receptacles having pistons in independent opposition to movement of the hangers in either direction, and an air-containing reservoir in unobstructed direct communication with the air-receptacles, the reservoir being of greater area than the combined receptacles and provided with air under a predetermined constant pressure In testimony that I claim the foregoing I have hereunto set my hand at Milwaukee in the county of Milwaukee and State of Wisconsin in the presence of two witnesses.

FRED. R. SKIDMORE.

Witnesses:
 GEO. W. YOUNG,
 FRED PALM.